United States Patent
Bailin et al.

(10) Patent No.: US 8,805,359 B2
(45) Date of Patent: *Aug. 12, 2014

(54) METHOD AND APPARATUS FOR PROVIDING INTELLIGENT DEACTIVATION OF ELECTRONIC DEVICES IN AIRCRAFT

(75) Inventors: David R. Bailin, Westport, CT (US); Charles Abraham, Los Gatos, CA (US)

(73) Assignee: Global Locate, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/448,209

(22) Filed: Apr. 16, 2012

(65) Prior Publication Data
US 2012/0200384 A1    Aug. 9, 2012

Related U.S. Application Data

(63) Continuation of application No. 11/207,319, filed on Aug. 19, 2005, now Pat. No. 8,160,577.

(51) Int. Cl.
*H04W 4/00* (2009.01)

(52) U.S. Cl.
USPC ........... 455/431; 455/411; 455/410; 455/418; 455/414.1; 455/422.1

(58) Field of Classification Search
USPC ........... 455/431, 411, 410, 418, 414.1, 422.1, 455/456.1, 456.6
See application file for complete search history.

(56) References Cited

U.S. PATENT DOCUMENTS

| | | | |
|---|---|---|---|
| 6,490,455 B1 | 12/2002 | Park et al. | |
| 6,527,225 B1 | 3/2003 | Silder et al. | |
| 7,047,114 B1* | 5/2006 | Rogers | 701/21 |
| 8,160,577 B2 | 4/2012 | Bailin et al. | |
| 2002/0055363 A1* | 5/2002 | Tanaka | 455/456 |
| 2003/0008644 A1 | 1/2003 | Akhterzzaman et al. | |
| 2003/0119445 A1* | 6/2003 | Bromham et al. | 455/39 |
| 2003/0139205 A1* | 7/2003 | Belcher et al. | 455/565 |
| 2004/0203915 A1 | 10/2004 | van Diggelen et al. | |
| 2005/0052318 A1 | 3/2005 | Jendbro et al. | |
| 2005/0113124 A1 | 5/2005 | Syrjarinne et al. | |
| 2005/0143918 A1 | 6/2005 | Hilliard et al. | |
| 2005/0148346 A1 | 7/2005 | Maloney et al. | |
| 2006/0099966 A1 | 5/2006 | Moton et al. | |
| 2006/0178108 A1* | 8/2006 | Chotoku et al. | 455/26.1 |
| 2007/0072553 A1 | 3/2007 | Barbera | |
| 2008/0139183 A1* | 6/2008 | Keohane et al. | 455/414.1 |

* cited by examiner

*Primary Examiner* — Khai M Nguyen
(74) *Attorney, Agent, or Firm* — Fiala & Weaver P.L.L.C.

(57) ABSTRACT

A method and apparatus for automatically deactivating an electronic device during flight of an aircraft. The method utilizes a global positioning system (GPS) or assisted global positioning system (AGPS) circuit to facilitate computing the acceleration, velocity and altitude of the electronic device and comparing this information to a profile to determine whether the acceleration, altitude and velocity meets a profile threshold of an airliner taking off. If the profile is that of the take-off of an aircraft, then the circuitry connected to the GPS/AGPS circuit will be deactivated.

20 Claims, 3 Drawing Sheets

METHOD AND APPARATUS FOR PROVIDING INTELLIGENT DEACTIVATION OF ELECTRONIC DEVICES IN AIRCRAFT

CROSS-REFERENCE TO RELATED APPLICATIONS

This application is a continuation of U.S. application Ser. No. 11/207,319, filed Aug. 19, 2005, now U.S. Pat. No. 8,160,577, which is hereby incorporated by reference herein its entirety.

BACKGROUND OF THE INVENTION

1. Field of the Invention

The present invention generally relates to satellite position location systems and, more particularly, to a method and apparatus for providing intelligent deactivation of electronic devices within aircraft using a satellite position location system.

2. Description of the Related Art

It is a Federal Aviation Administration mandate that all electronic devices used by passengers on commercial aircraft be deactivated prior to takeoff and during flight. Upon landing the electronic devices may be reactivated. This requirement is ostensibly enforced to prevent interference with the electronics on board the aircraft from radiation emitted by the electronic devices.

In many instances, passengers disregard the instructions regarding deactivation of their devices and keep their electronic devices operating during flight. Such operation is illegal as well as dangerous to the other passengers on board the aircraft.

Therefore, there a need in the art for a method and apparatus for automatically deactivating electronic devices upon takeoff and during the flight of a commercial aircraft.

SUMMARY OF THE INVENTION

The present invention is a method and apparatus for automatically deactivating an electronic device during flight of an aircraft. The invention utilizes a global positioning system (GPS) or assisted global positioning system (AGPS) circuit for computing the acceleration, velocity and altitude of the electronic device and comparing the information from the GPS/AGPS circuitry to a profile to determine whether the acceleration, altitude and velocity meets the profile of a takeoff of a commercial airliner. If the profile is that of the takeoff of an aircraft, then the circuitry connected to the GPS/AGPS circuit will be deactivated.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for determining whether or not whether an electronic device is located within an aircraft that is taking off. If such a takeoff profile is identified, the present invention deactivates the electronic device. Those skilled in the art will appreciate that the invention may be used with various types of mobile or wireless devices that are "location enabled" such as cellular telephones, pagers, laptop computers, Personal Digital Assistants (PDAs) and the like type wireless devices known in the art. Generally, a location enabled mobile device is facilitated by including in the device a capability of receiving and processing Satellite Positioning System (SPS), satellite signals, such as those signals provided by the Global Positioning System (GPS), Glonass, and/or Galileo.

Figure 1:
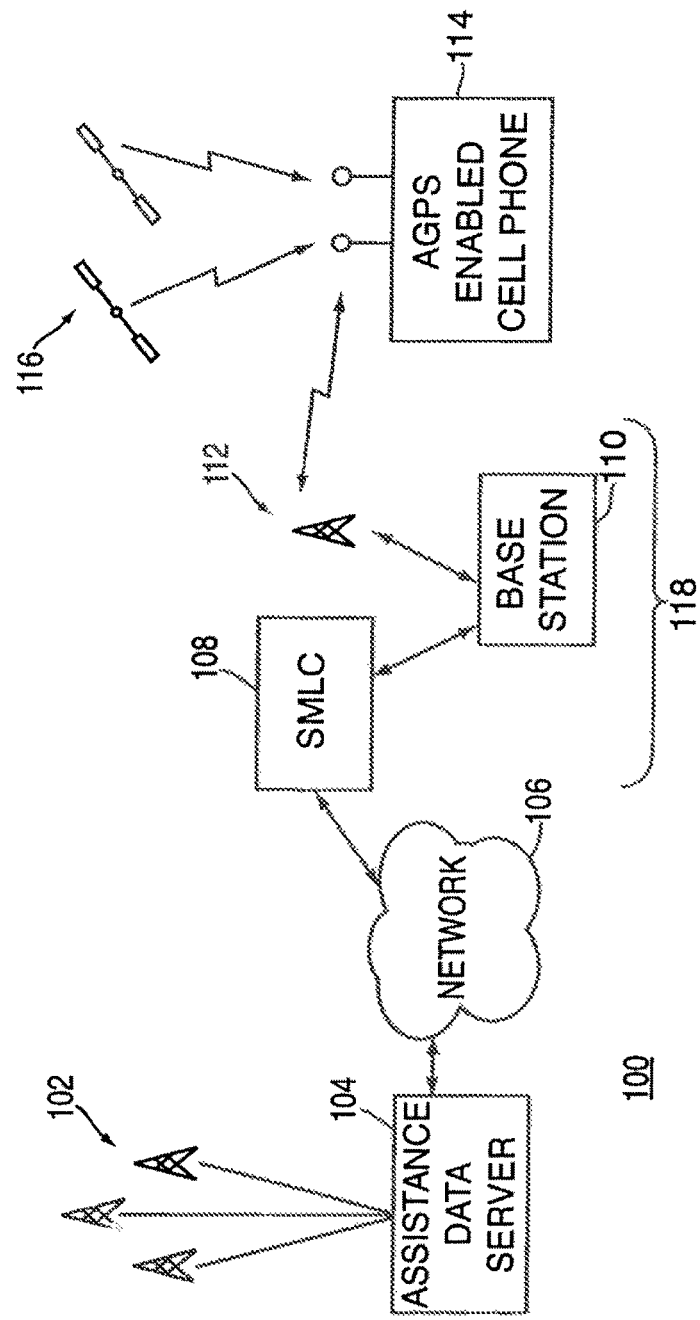
FIG. 1 is a block diagram of an exemplary embodiment of a satellite position location system.

FIG. 1 depicts a block diagram of an assisted GPS (AGPS) 100 system that provides location based services to location enabled devices. In this particular embodiment, the location enabled device is, for example, a cellular telephone 114. The AGPS system 100 comprises a reference network 102 and assistance data server 104, a communications network 106, a cellular telephone network 118, and a cellular telephone 114. The reference network 102 receives satellite signals from a satellite network 116 such as the GPS system. These satellite signals are aggregated by the assistance data server 104 to generate assistance data that is transmitted to the location enabled devices to assist them in operating in low signal-to-noise ratio (SNR) environments. Such assisted GPS systems are well known in the art and, for example, are described in commonly assigned U.S. Pat. Nos. 6,453,237, 6,590,530, and 6,587,789. Each of these patents are incorporated here and by reference in their entirety.

The assistance data server 104 provides assistance data, generally comprising, ephemeris or other satellite orbit data, time, and an estimated position of the cellular telephone. This information is coupled through a communication network 106 to a serving mobile location center (SMLC) 108 (or equivalent) within the cellular network 118. The SMLC 108 is a data center that provides data services to various base stations 210 within a cellular network 118. The assistance data is coupled through the SMLC 108 to the base station 110 for transmission from a cellular antenna tower 112 that is coupled to the base station 110. This data is communicated to the AGPS enabled cellular telephone 114.

By combining signals received from satellites 116 with the assistance data, the AGPS enabled cellular telephone 114 can compute its geographic position on the Earth. In an alternative mode of operation, the cellular telephone 114 may communicate the satellite signals or information about the satellite signals through the cellular network 118 and the communication network 106 to the assistance data server 104 such that the assistance data server 104 can compute the position of the cellular telephone 114. This position is then relayed through the network 106 and the cellular network 118 to the cellular telephone 114 for its use. In a third mode of operation, the cellular telephone may operate autonomously from the network and merely receive satellite signals from the satellites and compute its position as is performed by a classical GPS receiver. Although autonomous mode operation requires a large signal to noise ratio (SNR) as well as a substantial period of time to perform the calculation, in some instances, where cellular telephone communication is limited, such an autonomous method of operation is useful.

For the present invention, whether the electronic device has a classical GPS receiver or an assisted GPS receiver or a combination of both is not particularly important. The general requirement is that the electronic device (e.g., cellular telephone) must be capable of determining its motion profile within its environment comprising, for example, at least one of the velocity, altitude, and/or acceleration of the electronic device within which the AGPS or GPS receiver is embedded. This profile of the current environment for the electronic device is used to determine whether the electronic device is presently located on an aircraft that is taking off.

Figure 2:
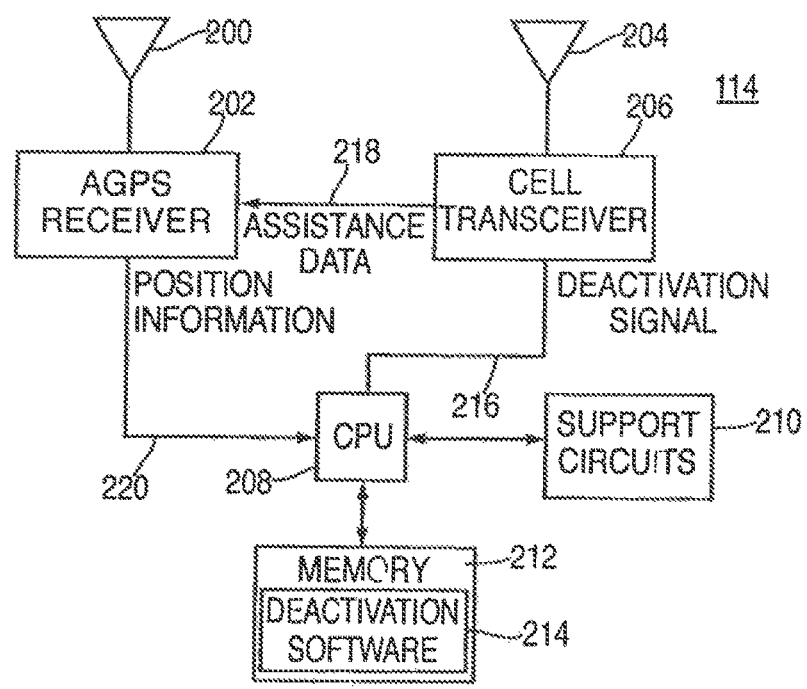
FIG. 2 is a block diagram of an exemplary embodiment of a cellular telephone incorporating the present invention.

FIG. 2 depicts a block diagram of an AGPS enabled cellular telephone 114. The telephone 114 comprises a GPS antenna 200, a cellular telephone antenna 204, a GPS receiver 202, a cellular telephone transceiver 206, a central processing unit (CPU) 208, support circuits 210, and memory 212. Cellular transceiver 206 receives and transmits signals to the cellular system via the antenna 204 in a conventional manner. The assistance data that is received from the cellular network is transmitted on path 218 to the AGPS receiver 202. The AGPS receiver 202 receives satellite signals through antenna 200 and processes those signals in conjunction with the assistance data to determine a position of the AGPS receiver 202. The AGPS receiver position is communicated to the CPU 208 along path 220. In MS-assisted mode, the assistance data server may compute the position and transmit that position through the cellular transceiver and, as such, the cellular transceiver 206 will communicate the position information to the CPU 208.

The CPU 208 may be one or more conventional microprocessors or microcontrollers. The CPU 208 is coupled to support circuits 210. The support circuits 210 facilitate operation of the CPU 208 and comprise well-known circuits such as input/output circuits, cache, clock circuits, and power supplies, and the like. The CPU 208 is also coupled to memory 212. Memory 212 may comprise random access memory, read only memory, removable storage, magnetic storage, optical storage, and combinations thereof. The memory 212 stores deactivation software 214 that is executed by the CPU to implement the present invention. When the deactivation software 214 is executed and analyzes the position information that is provided by the AGPS receiver 202, the CPU 208 may generate a deactivation signal on path 216 that deactivates the cellular transceiver. In a more general sense, when the environmental profile computed from the position information meets a certain criteria, the CPU 208 creates a deactivation signal for the electronic device in which the GPS receiver is embedded. Although, FIG. 2 depicts the deactivation signal only deactivating the cellular transceiver 206, in most applications the entire electronic device including the CPU 208 itself and the AGPS 202 receiver as well as the cellular transceiver 206 would be deactivated to comply with the FAA regulations. In other applications, the electronic device may be a laptop computer, PDA, pager, headphones, or other type of electronic device that would be carried aboard an aircraft. In any event, the deactivation signal would deactivate any of these electronic devices in which the GPS/AGPS receiver was embedded.

Figure 3:
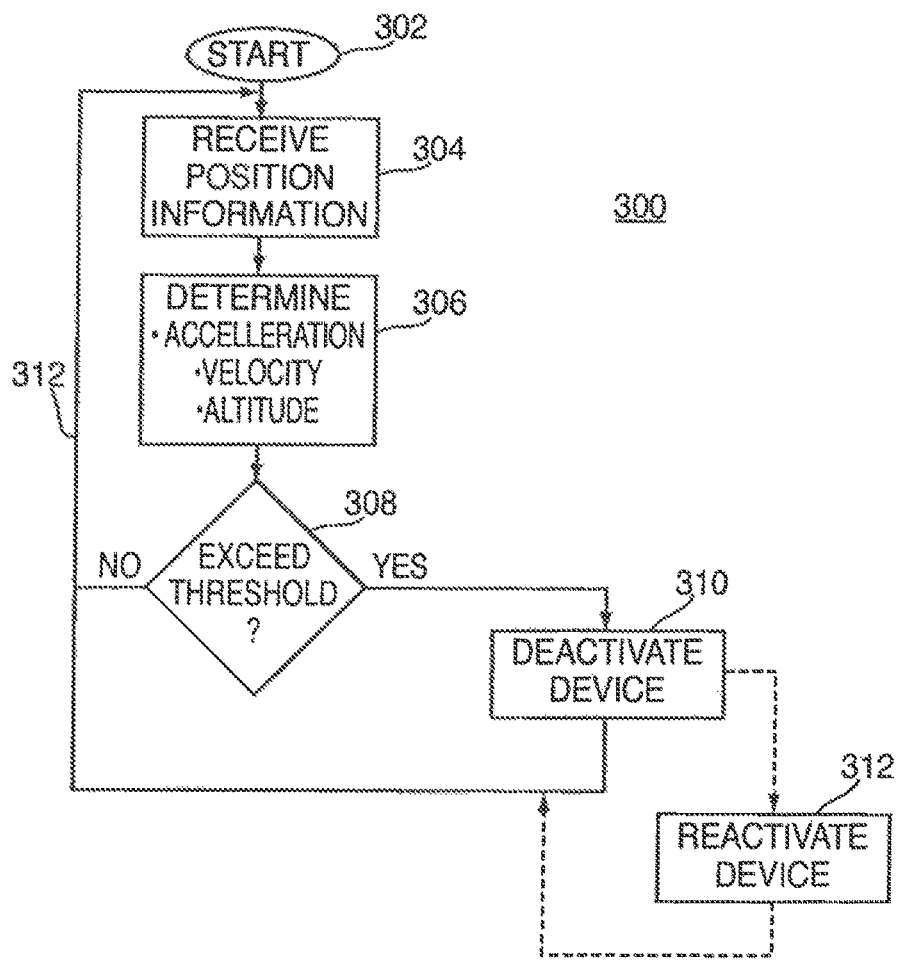
FIG. 3 depicts a flow diagram of a method of operation of the present invention.

FIG. 3 depicts a flow diagram of a method 300 of operation of the present invention. The method 300 begins at step 302 and proceeds to step 304 where position information is received by the method 300. At step 306, the position information is analyzed to determine acceleration, velocity and/or altitude of the electronic device. This information defines a profile of the motion environment in which the electronic device is operating. Those skilled in the art may develop additional parameters for the profile or may be able to utilize less parameters in a particular situation. Although, for defining a take-off profile for an aircraft, altitude may be a single parameter that could be used to determine whether deactivation is necessary. However, to ensure that deactivation does not occur with a change in altitude for other reasons, a profile can be generated using at least one of acceleration, velocity, attitude or a combination thereof that can uniquely identify the takeoff profile parameters of an aircraft. Various combinations of parameters may be used such as a high velocity (exceeding 150 MPH) for a period of time, rapid acceleration, changes in altitude that indicate a steep climb from a runway, and the like.

At step 308, the method 300 compares the profile to a threshold to decide whether or not the profile is that of an aircraft taking off. For example, a commercial airline at takeoff may travel at 180 mph, accelerate from 0 to 180 mph in 10,000 feet or so, and climb 1000 feet in altitude while traveling at 180 mph or more. If these parameters are met, the electronic device is deactivated. If the threshold is not exceeded at step 308 the method proceeds along path 312 to receive additional position information at step 304 and continue to process such information. If the threshold is exceeded at step 308 the method 300 proceeds to step 310 where the electronic device is deactivated.

In an alternative embodiment, the deactivation may not be automatic and an indicator may be generated at step 310 that allows an operator to override the deactivation process prior to automatic deactivation. If a period of time in which the deactivation override is not activated, then the automatic deactivation will occur. Such an option allows a user to override the decision that the electronic device is on an aircraft taking off, if that is not the case.

In another alternative embodiment of the invention, the reverse operation may be utilized to determine when a flight has landed to reactivate the electronic device. However, in such a case the assisted GPS unit would have to remain active during the flight which under current FAA regulations is not permitted. If those regulations were relaxed to limit only the activation of the transceiver of the cellular telephone, or some other transmitting device, to be required to be deactivate, then the AGPS receiver could remain operational and a profile could be generated for deceleration, velocity and altitude to determine that an aircraft has landed. Upon landing, as indicated by step 312 of FIG. 3, the electronic device or a portion thereof, i.e., the cellular transceiver, could be reactivated automatically.

While the foregoing is directed to embodiments of the present invention, other and further embodiments of the invention may be devised without departing from the basic scope thereof, and the scope thereof is determined by the claims that follow.

The invention claimed is:

1. A location enabled device, comprising:
a satellite receiver configured to compute a location of the location enabled device based upon a satellite signal;
a cellular transceiver configured to provide cellular communications between the location enabled device and other electronic devices communicatively coupled to a cellular network; and
a processor configured to determine a motion parameter of the location enabled device based upon the location and to compare the motion parameter with a motion parameter of an aircraft that is taking off to determine whether the location enabled device is within the aircraft that is taking off, the processor further configured to deactivate the cellular transceiver when it is determined that the location enabled device is within the aircraft that is taking off.

2. The location enabled device of claim 1, wherein the cellular transceiver is further configured to receive assistance data from the cellular network, and
wherein the satellite receiver is further configured to determine the location based upon assistance data.

3. The location enabled device of claim 2, wherein the assistance data comprises:
data relating to an orbit of a satellite that provided the satellite signal; or
an estimated position of the location enabled device.

4. The location enabled device of claim 1, wherein the motion parameter comprises:
a velocity of the location enabled device;
an altitude of the location enabled device; or
an acceleration of the location enabled device.

5. The location enabled device of claim 1, wherein the location enabled device is implemented as part of an electronic device, and
wherein the processor is further configured to deactivate the electronic device when it is determined that the location enabled device is within the aircraft that is taking off.

6. The location enabled device of claim 1, wherein the processor is further configured to compare the motion parameter with a threshold corresponding to the motion parameter of the aircraft that is taking off to determine whether the location enabled device is within the aircraft that is taking off.

7. The location enabled device of claim 6, wherein the parameter comprises:
a velocity of the location enabled device;
an altitude of the location enabled device; or
an acceleration of the location enabled device, and
wherein the parameter of the aircraft that is taking off comprises:
a velocity of the aircraft when it is taking off;
an altitude of the aircraft when it is taking off; or
an acceleration of the aircraft when it is taking off.

8. The location enabled device of claim 1,
wherein the processor is further configured to notify a user of the location enabled device that the cellular transceiver is to be deactivated when it is determined that the location enabled device is within the aircraft that is taking off.

9. A method of deactivating a location enabled device, comprising:
determining a motion parameter of the location enabled device based upon a location of the location enabled device;
comparing the motion parameter to a threshold corresponding to a motion parameter of an aircraft that is taking off;
determining that the location enabled device is within the aircraft that is taking off when the motion parameter is greater than or equal to the threshold; and
deactivating at least some portion of the location enabled device when it is determined that the location enabled device is within the aircraft that is taking off.

10. The method of claim 9, further comprising:
reactivating the at least some portion of the location enabled device when it is determined that the location enabled device is no longer within the aircraft that is taking off.

11. The method of claim 10, wherein the reactivating comprises:
reactivating the at least some portion of the location enabled device when the motion parameter is less than the threshold.

12. The method of claim 9, further comprising:
computing the location based upon a satellite signal and assistance data that is received over a cellular network.

13. The method of claim 12, wherein the computing comprises:
computing the location based upon the satellite signal and the assistance data, the assistance data being:
data relating to an orbit of a satellite that provided the satellite signal; or
an estimated position of the location enabled device.

14. The method of claim 9, further comprising:
notifying a user of the location enabled device that the at least some portion of the location enabled device is to be deactivated when it is determined that the location enabled device is within the aircraft that is taking off.

15. A location enabled device, comprising:
a receiver configured to compute a location of the location enabled device; and
a processor configured to determine a motion parameter of the location enabled device based upon the location, to compare the motion parameter to a threshold corresponding to a motion parameter of an environment, and to deactivate at least some portion of the location enabled device when it is determined that the location enabled device is within the environment, the environment being an aircraft that is taking off.

16. The location enabled device of claim 15, wherein the receiver is further configured to compute the location based upon a satellite signal or assistance data that is received over a cellular network.

17. The location enabled device of claim 15, wherein the parameter comprises:
a velocity of the location enabled device;
an altitude of the location enabled device; or
an acceleration of the location enabled device, and
wherein the parameter of the environment comprises:
a velocity of the environment;
an altitude of the environment; or
an acceleration of the environment.

18. The location enabled device of claim 15, further comprising:
a cellular transceiver configured to provide cellular communications between the location enabled device and other electronic devices communicatively coupled to a cellular network,
wherein the processor is further configured to deactivate the cellular transceiver when it is determined the location enabled device is within the environment.

19. The location enabled device of claim 18, wherein the processor is further configured to notify a user of the location enabled device that the cellular transceiver is to be deactivated when it is determined that the location enabled device is within the environment.

20. The location enabled device of claim 15, wherein the location enabled device is implemented as part of an electronic device, and
wherein the processor is further configured to deactivate the electronic device when it is determined that the location enabled device is within the environment.

* * * * *